US006941026B1

(12) United States Patent
Nadabar et al.

(10) Patent No.: US 6,941,026 B1
(45) Date of Patent: Sep. 6, 2005

(54) METHOD AND APPARATUS USING INTENSITY GRADIENTS FOR VISUAL IDENTIFICATION OF 2D MATRIX SYMBOLS

(75) Inventors: Sateesh Gopalakrishna Nadabar, Framingham, MA (US); Ranjit Desai, Sudbury, MA (US)

(73) Assignee: Cognex Corporation, Natick, MA (US)

( * ) Notice: Subject to any disclaimer, the term of this patent is extended or adjusted under 35 U.S.C. 154(b) by 681 days.

(21) Appl. No.: 09/592,839

(22) Filed: Jun. 13, 2000

(51) Int. Cl.[7] .......................... G06K 9/40; G06K 9/56
(52) U.S. Cl. ...................... 382/265; 382/274; 382/205
(58) Field of Search ................................ 382/182, 183, 382/184, 190, 195, 203, 205, 256, 257, 260, 382/261, 262, 263, 264, 265, 270, 274, 308; 235/494; 400/103

(56) References Cited

U.S. PATENT DOCUMENTS

| 4,924,078 A | 5/1990 | Sant'Anselmo et al. |
| 4,939,354 A | 7/1990 | Priddy et al. |
| 5,053,609 A | 10/1991 | Priddy et al. |
| 5,124,536 A | 6/1992 | Priddy et al. |
| 5,124,537 A | 6/1992 | Chandler et al. |
| 5,138,140 A | 8/1992 | Siemiatkowski et al. |
| 5,155,343 A | 10/1992 | Chandler et al. |
| 5,170,277 A | 12/1992 | Bard et al. |
| 5,262,623 A | 11/1993 | Batterman et al. |
| 5,276,315 A | 1/1994 | Surka |
| 5,296,690 A | 3/1994 | Chandler et al. |
| 5,331,176 A | 7/1994 | Sant'Anselmo et al. |
| 5,343,031 A * | 8/1994 | Yoshida ...................... 235/494 |
| 5,378,883 A | 1/1995 | Batterman et al. |
| 5,454,054 A * | 9/1995 | Iizuka ......................... 382/321 |
| 5,473,151 A * | 12/1995 | Priddy et al. ................ 235/494 |
| 5,523,552 A | 6/1996 | Shellhammer et al. |
| 5,581,067 A | 12/1996 | Grosfeld et al. |
| 5,591,956 A | 1/1997 | Longacre, Jr. et al. |
| 5,612,524 A | 3/1997 | Sant'Anselmo et al. |
| 5,621,371 A | 4/1997 | Dvorkis et al. |
| 5,675,137 A | 10/1997 | Van Haagen et al. |
| 5,717,221 A | 2/1998 | Li et al. |

(Continued)

FOREIGN PATENT DOCUMENTS

EP          0 438 841 A1     7/1991

OTHER PUBLICATIONS

Cognex Corporation, *MVS-8000 Series*, CVL Vision Tools Guide: Chapter 5, Symbol Tool, CVL 5.4, Dec., 1999.

(Continued)

*Primary Examiner*—Mehrdad Dastouri (57) ABSTRACT

Visual information regarding intensity and intensity-based gradient information is used in a multi-step process for accurately locating and decoding an encoded visual symbol matrix. A symbol is preprocessed with filtering and morphology. A set of coarse locations of candidate symbols is filtered according to coarse geometric criteria to determine which image locations are most viable. Depending upon the symbol type, and information about the edges of the symbols, additional symbol-specific filtering and refinements can be applied or skipped. For 2D matrices filtering according to intensity variance criteria is followed by an edge-locating refinement and by identifying finder patterns and timing patterns. Once finder patterns and timing patterns are precisely located, the data region is decoded. Where a data region does not decode validly, another pass is run, using the non-morphed image, resulting in an overall saving of time, as rejections may require operator intervention.

8 Claims, 5 Drawing Sheets

U.S. PATENT DOCUMENTS

| | | |
|---|---|---|
| 5,723,868 A | 3/1998 | Hammond, Jr. et al. |
| 5,736,724 A | 4/1998 | Ju et al. |
| 5,739,518 A | 4/1998 | Wang |
| 5,744,815 A | 4/1998 | Gurevich et al. |
| 5,773,806 A | 6/1998 | Longacre, Jr. |
| 5,780,834 A | 7/1998 | Havens et al. |
| 5,784,102 A | 7/1998 | Hussey et al. |
| 5,786,586 A | 7/1998 | Pidhirny et al. |
| 5,793,033 A | 8/1998 | Feng et al. |
| 5,796,089 A | 8/1998 | Marom |
| 5,818,028 A | 10/1998 | Meyerson et al. |
| 5,825,006 A | 10/1998 | Longacre, Jr. et al. |
| 5,834,754 A | 11/1998 | Feng et al. |
| 5,837,985 A | 11/1998 | Karpen |
| 5,889,270 A | 3/1999 | Van Haagen et al. |
| 5,920,060 A | 7/1999 | Marom |
| 5,932,862 A | 8/1999 | Hussey et al. |
| 5,949,057 A | 9/1999 | Feng |
| 5,969,323 A | 10/1999 | Gurevich et al. |
| 6,019,286 A | 2/2000 | Li et al. |
| 6,045,047 A | 4/2000 | Pidhirny et al. |
| 6,070,805 A * | 6/2000 | Kaufman et al. ............ 235/494 |
| 6,244,764 B1 * | 6/2001 | Lei et al. .................... 400/103 |

OTHER PUBLICATIONS

Baptiste Marcel and Michel Cattoen, *Edge and Line Detection in Low Level Analysis*, Groupe Signaux, Images et Communication, Laboratorie Electronique, France.

Dean Barnes, Jon Bradshaw, Lorne Day, Tom Schott, and Ryan Wilson, *Two Dimensional Bar Coding*, Purdue University, Tech 621, 1999.

SEMI (Semiconductor Equipment and Material International), Standard for 2 inch Polished Monocrystalline Silicon Wafers, SEMI M1, 1-89, Feb. 1999.

SEMI (Semiconductor Equipment and Materials International), Specifications for Polished Monocrystalline Wafer, SEMI M1-0600, 2000.

SEMI (Semiconductor Equipment and Materials International), Specifications for Serial Alphanumeric Marking of the Front Surface of Wafers, SEMI M12-0998, 1999.

SEMI (Semiconductor Equipment and Materials International), Specification for Alphanumeric Marking of Silicon Wafers, SEMI M13-0998, 1999.

SEMI (Semiconductor Equipment and Materials International), Specification for Back Surface Marking of Double-Side Polished Wafers With A Two-Dimensional Matrix Code Symbol, SEMI T7-0997, 2000.

* cited by examiner

METHOD AND APPARATUS USING INTENSITY GRADIENTS FOR VISUAL IDENTIFICATION OF 2D MATRIX SYMBOLS

FIELD OF INVENTION

The present invention relates to industrial vision systems, particularly vision systems for recognition and interpretation of encoded graphical information.

BACKGROUND

Two-dimension (2D) matrix symbols are becoming increasingly popular in automated identification applications due to their compact size, large data capacity and their built-in error checking and correction. The encoded information is represented as a binary pattern arranged as a 2D matrix of lines, dots or squares. Characteristic patterns are appended to the 2D matrix to allow the matrix to be located and distinguished easily during decoding. These factors allow the appropriate 2D symbology to be used in specific ID applications such as semiconductor wafer marking and document labels.

For example, the Data Matrix symbology, is a popular choice in wafer ID applications, as described in the International Symbology Specification—Data Matrix, AIM International, Inc. which is incorporated herein by reference. Each symbol can be considered to be made up of three structural elements: (1) A characteristic symbology-specific finder pattern, (2) a timing pattern, and (3) the data region in which the binary pattern representing the encoded data is placed. A matrix having 8 rows and 32 columns has been adopted as a standard by SEMI: Semiconductor Equipment and Materials International, of Mountain View, Calif., in standard T7-0997, which is incorporated herein by reference.

The matrix defined in the SEMI standard has overall dimensions of 4.00 mm wide, 1 mm high, with dots having a 125 $\mu$m spacing. The standard instructs users processing round 300 mm diameter wafers to imprint the matrix symbol at a location on the wafer that is approximately 5.0±0.1 degrees from the orientation fiducial axis, and just outside of the outer periphery of the fixed quality area (FQA), at a distance of 148.95±0.15 mm from the center. According to the SEMI specifications, a "cell" is defined as an area in which a dot may be placed to represent binary data. A "dot" is "a localized region with a reflectance which differs from that of the surrounding surface." A minimum contrast of 30% is required. The location reference point is defined as "the physical centerpoint of the cell common to the primary border row and the center alignment bar." The center alignment bar of SEMI comprises a line of solid dots abutting a line of alternately filled and empty cells. Some amount of misalignment of dots is contemplated in the standards, and specified at no more than 20 $\mu$m, for dots having a circular diameter or square edge of no less than 100 $\mu$m+/−10 $\mu$m. Similar specifications apply to the symbols, locations, and tolerances for bar codes, such as in the Guidelines for Producing Quality Symbols, containing information about universal product codes (UPC), reduced space symbology (RSS), and stacked bar codes available from Uniform Code Council, Inc., of Lawrenceville, N.J.

In a typical application, a given data string (tag) is encoded by a suitable symbology-specific mathematical transformation into a binary pattern. A data string may include alphanumeric identification symbols that are encoded along with suitable error detection and correction codes (e.g., convolution codes, CRC, Reed-Solomon). This binary pattern is mapped onto the data region of the 2D symbol. The characteristic finder and timing patterns are appended to the symbol and the symbol pattern is marked onto the item being tagged. The marking technique may depend upon the particular application. For example, a laser marking mechanism is used for direct marking on semiconductor wafers, while ink-based printers are used for document labels.

Sophisticated decoding algorithms have to be designed to extract the information encoded in the 2D symbol. Decoders based upon machine vision are increasingly being employed for this purpose because of their relative speed and robustness, i.e., the ability to properly detect the encoded information under sub-optimal conditions. Machine Vision-based scanners typically use the following general approach:

(1) A 2D image of the surface on which the symbol is marked is obtained (for example using a conventional solid-state camera, i.e., CCD), and (2) The acquired image is then analyzed using a decoding algorithm consisting of two steps:
  (i) locate the rectangular region which contains the pattern, and
  (ii) decipher the binary pattern and extract the encoded data string.

The robustness of the decoding algorithm is in large part affected by three main factors which influence the appearance of the symbol: (1) the marking techniques used, (2) the surface upon which the symbol is printed, and (3) the illumination and optics used to acquire the 2D image. These factors contribute to significant deviations of the appearance of the symbol in real-world applications, as compared to the ideal binary pattern (e.g. as laid forth in the AIM specification). The typical image of the 2D symbol suffers from problematic artifacts, which are manifested as geometric distortions of individual data elements, because of non-uniform background, or poor image quality, among other reasons.

Existing techniques for 2D matrix location are based upon "connected component analysis" and are vulnerable to errors when applied to the task of locating 2D symbols that have been distorted as described above. The present state of the art does not permit locating 2D symbols precisely while having the ability to handle a wide variety of distortion. The connected component-based approach, combined with intensity area correlation to locate the matrix, is very susceptible to marking variations that cause the symbol finder pattern elements to appear distorted. For example, distortion causes contiguous data modules along the finder pattern area and within the symbol to appear as being separated by "breaks" between adjacent modules (e.g. for standardized Data Matrix symbols), caused by scratches and smears along the symbol.

Similarly, known machine vision-based decoders cannot handle a large variety of symbols irrespective of variations in the marking and symbol quality. This requires the use of different processes, depending upon the symbology to be recognized. Automatic selection among several computational methods may be possible in real-time, however, they would be necessarily slow.

SUMMARY OF THE INVENTION

The present invention provides a new and useful system whereby visual information regarding intensity and gradient are used in a multi-step process for accurately locating an encoded symbol matrix. The system combines gradient information intelligently with intensity information to locate the position of the symbol accurately in two stages without any appreciable change in the processing time. A generic model is used for a wide variety of symbols. This is a significant departure from earlier techniques and increases reliability and throughput.

According to the invention, visual information regarding intensity and gradient are used in a multi-step process for accurately locating and decoding an encoded visual symbol matrix. A symbol is preprocessed with filtering and morphology. A set of coarse locations of candidate symbols is filtered according to coarse geometric criteria to determine which image locations are most viable. Depending upon the symbol type, and intensity gradient information, additional symbol-specific filtering and refinements can be applied or skipped. For 2D matrices, filtering according to intensity variance criteria is followed by an edge-locating refinement and by identifying finder patterns and timing patterns. Once finder patterns and timing patterns are precisely located, the data region is decoded. Where a data region does not decode validly, another pass is run, using the non-morphed image, resulting in an overall saving of time, as rejections may require operator intervention.

This system and method according to the invention overcomes drawbacks associated with previous techniques related to accuracy, reliability and throughput. Matrix location is a critical step during decoding. Often, the decoder is presented with a symbol and is expected to learn all relevant attributes without supervision (e.g., shape, orientation). A large variety of marking procedures can be used, and recalibration for each run adds delay and potential human errors. A failure to identify these attributes prior to decoding can cause an expensive rejection that may require operator intervention. Stopping production for such failures can be expensive in terms of time, and can slow down throughput on the customer's assembly line. Unlike existing solutions, the present invention permits the operator to select from several types of different symbols. The disclosed system comprises a visual decoder that is more adaptable to the realistic visual circumstances, and less prone to errors.

The disclosed method can be applied in conjunction with existing intensity area correlation based methods to provide a more accurate location of the symbol. Intensity area correlation based methods could introduce errors if the image quality contains potentially confusing information resulting in false matches. By combining both intensity and gradient based information, the proposed approach will provide better discrimination capability in such cases.

Since many types of 2D symbols share the basic characteristics described earlier (including dot matrices and bar codes), this approach can be generalized for locating 2D symbols of various types in a wide range of applications such as semiconductor wafer ID applications, document processing, pharmaceuticals and standard assembly line processes.

BRIEF DESCRIPTION OF THE FIGURES

These and other features of the present invention will be better understood in view of the following detailed description taken in conjunction with the drawings, in which.

DETAILED DESCRIPTION

Figure 1:
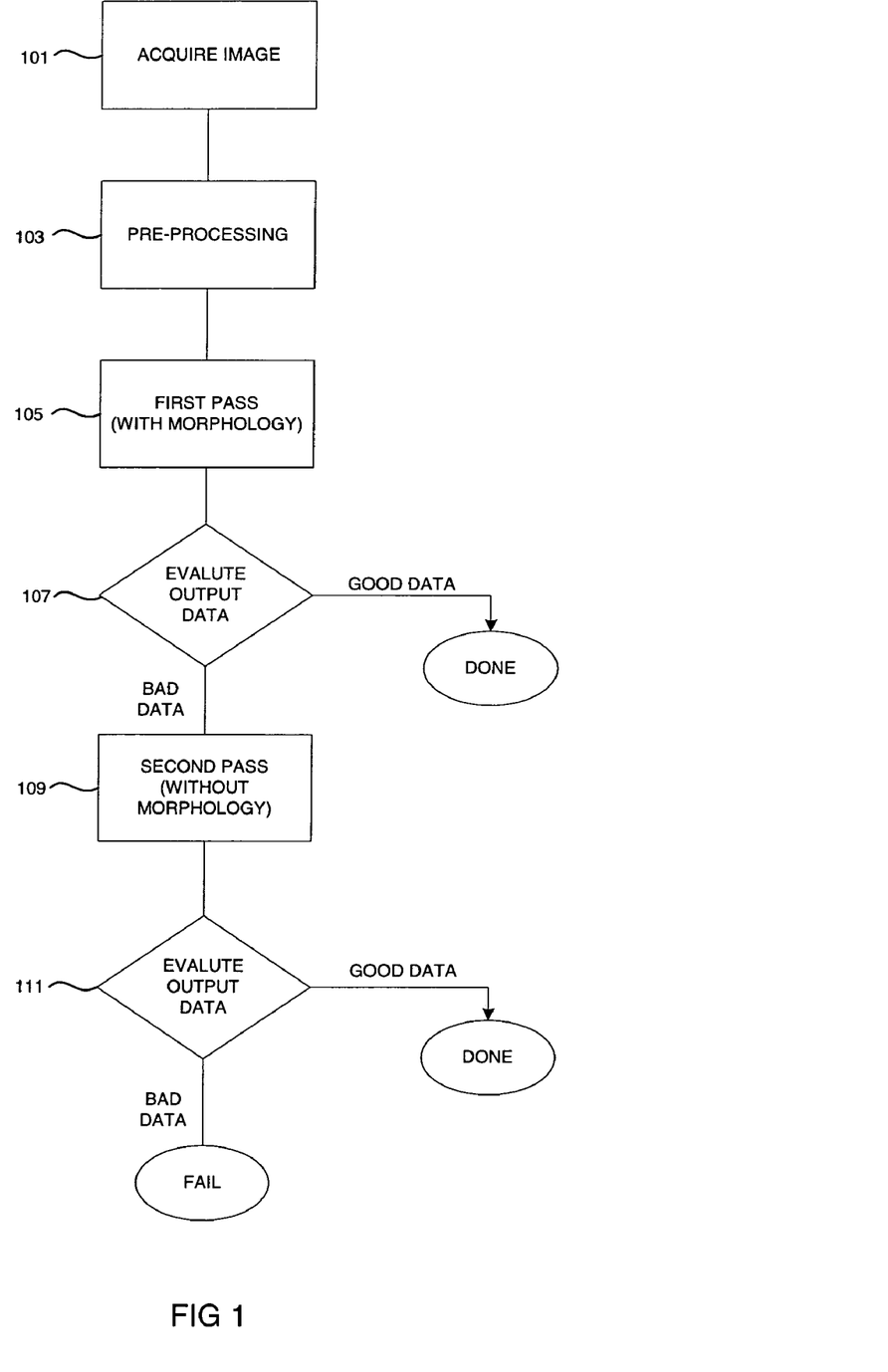
FIG. 1 is a flowchart illustrating operation of an illustrative embodiment according to the invention.

The apparatus and method according to the invention perform a flexible image analysis for robust decoding of symbolic data. As shown in FIG. 1, digitized images are acquired 101, pre-processed 103 to create a morphology image, and a first pass is made 105 to decode the symbol data. If the output data is not valid 107, a second pass is made 109 without the morphology, and the output data is again evaluated 111.

Figure 2:
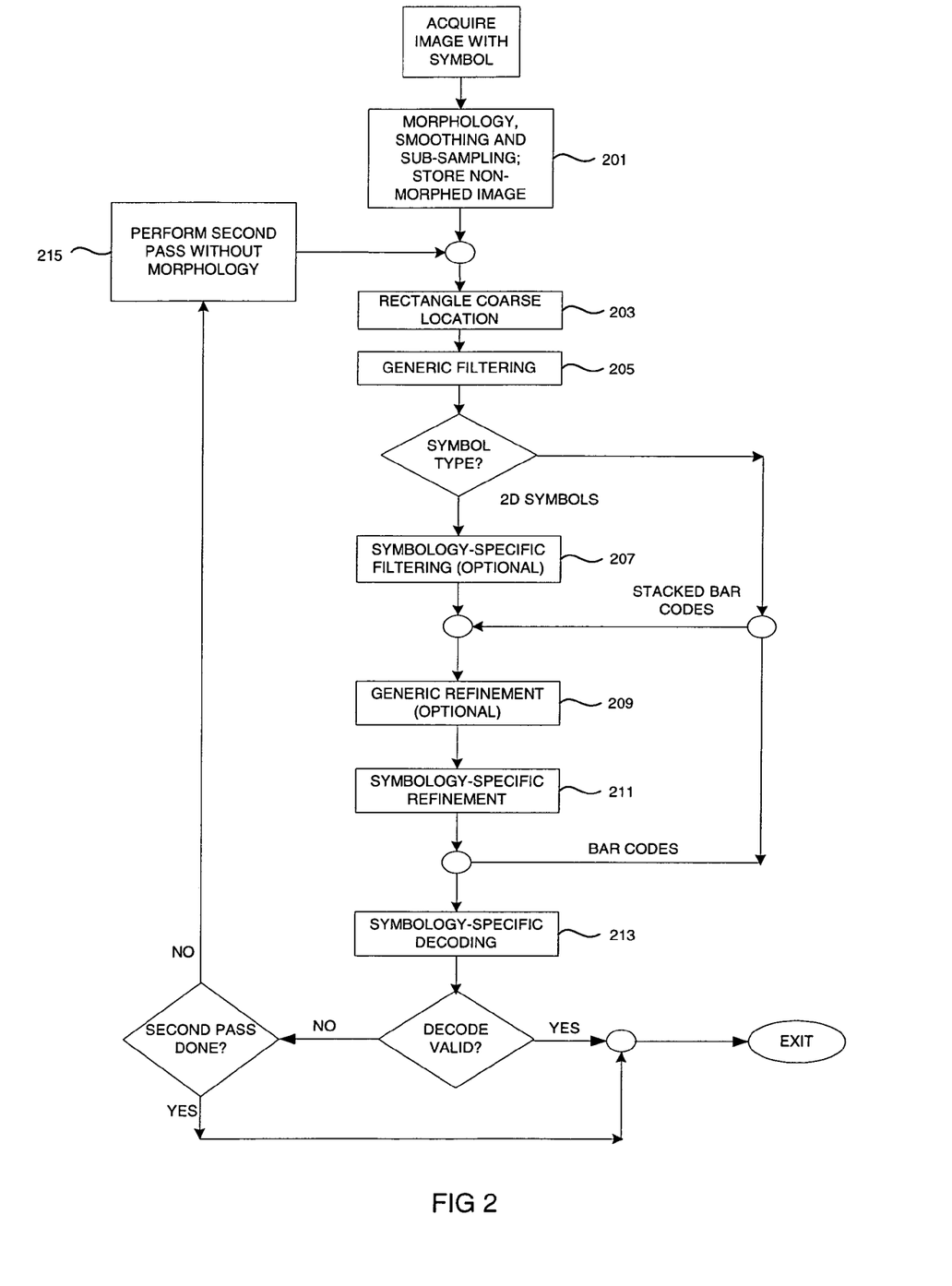
FIG. 2 is a flowchart illustrating additional details of the image processing according to an illustrative embodiment of the present invention.

As shown in FIG. 2, during each pass, after preprocessing 201, a coarse symbol location is found 203, and its data is filtered 205. Then, depending upon the selected symbol type, additional symbol-specific filtering 207 and generic refinement 209 and/or symbology-specific refinement 211 are imposed, if necessary. If the data cannot be decoded as valid 213, then the non-morphed image is retrieved 215 and another pass is made, resulting in either a valid decode or a failure result.

The image acquisition step 101 can be accomplished using apparatus and methods known in the art for creating a digitized image and temporarily storing it for further processing. Each data set representing a digital image is comprised of a 2D matrix of pixels, each having a corresponding gray-scale intensity value. For simplicity of discussion, this data set will be referred to as an "image." In general, a single image may be sufficient for the analysis of the symbol found in the image. However, the application could require that additional images be captured and analyzed prior to rejecting a unit as illegible. Each such image would be separately processed according to the invention. In an illustrative embodiment, an image is obtained by closely viewing a region of an object where an identification symbol is expected to be found, rather than a large region in which other confusing objects are likely. This approach offers the advantage of increasing system throughput by reducing the amount of superfluous data captured.

An image is then pre-processed 201 using a smoothing and sub-sampling sequence using a Gaussian-Kernel method, or by selecting other smoothing and sub-sampling methods which are known in the art. The smoothing reduces undesirable noise that would affect the symbol recognition. The sub-sampling reduces the amount of data necessary to capture the information, thus reducing the processing time.

According to the invention, a morphology step is introduced prior to the first decoding pass. The morphology portion of pre-processing is expected to produce an image that would allow the symbol position to be detected reliably. In general, the processing of a symbol to recognize and decode it takes much longer than a morphology computation. However, there remains some chance that the automatic morphology itself introduces uncertainties that cause a decoding failure.

In anticipation of running a second pass through the symbol-recognition process, a copy of the pre-processed image is retained, in accordance with the illustrative embodiment. If there are valid results from the first pass, then this copy is simply discarded. The advantage of this combination is that the manipulations of available morphology are exploited in most cases, at some investment in the calculations, thus increasing the overall system throughput, without losing the opportunity to use the non-morphed image before rejecting the unit.

A morphological filter is adapted to either dilate or erode the image, depending upon the contrast with respect to the background. For a dark symbol on a light background, an erosion filter is used, whereas for light on dark, a dilation filter is used. This filtering removes some of the random artifacts caused by geometric distortions, non-uniform background, and poor image quality. Artifacts can also make adjacent modules (dark or light areas) appear to be disconnected, and this could impede symbol recognition or give improper data decoding results.

Based upon the pre-processed image, the system estimates the coarse location of an area containing a symbol shape. Symbols may be of different shapes, including circular or rectangular. In the case of bar codes or 2D Data Matrices imprinted according to the requisite standards, the overall symbol is generally rectangular, and this model shall provide the basis for further explanation. The step of finding a coarse location for a symbol results in the identification of the four corners of a region containing an image that initially appears to be shaped like the desired symbol, along with other information such as the, pose (coarse location XY, aspect, scale angle of orientation), clutter and fit. A number of vision systems are available for carrying out the step of making a coarse identification of the location of a target shape. One such system is Pat Max, available from Cognex Corporation, Natick, Mass., or the HexSight product available from HexVision, of Saint Foy, Quebec, Canada. In an illustrative embodiment, a rectangular model is defined which approximates the characteristics of the symbol with respect to the first and second order derivatives of the pixel intensity information, considering both magnitude and direction. A first derivative gives information about how the signal intensity varies. The second derivative is useful for locating the intensity-based edges or peaks.

Once a symbol's coarse location is identified, a generic filtering 205 is applied to the image within the selected coarse location. This filtering is applied to each of the candidate symbol areas identified by the previous step, in order to eliminate locations that do not meet the predefined acceptance criteria. In an illustrative embodiment, the filtering can exclude those locations that have size, angle, or pose criteria that fail to meet a threshold value. The number of surviving candidates may be one or more image regions that are passed along to the next step.

Depending upon the type of symbol, additional information may be known about viable symbol candidates. For example, with a two-dimensional symbol, there may be specific parameters related to acceptance such as the overall dimensions of a symbol module, and the relationship between adjacent sides of a rectangle (the aspect ratio). In other applications, such as stacked (multiple) bar codes, there is no symbology-specific filtering or refinement necessary. In still other symbol types, such as a simple bar code, there is usually little to be gained from the additional computational complexity of such refinement, and processing should pass directly to the step of symbology-specific decoding 213.

Figure 6:
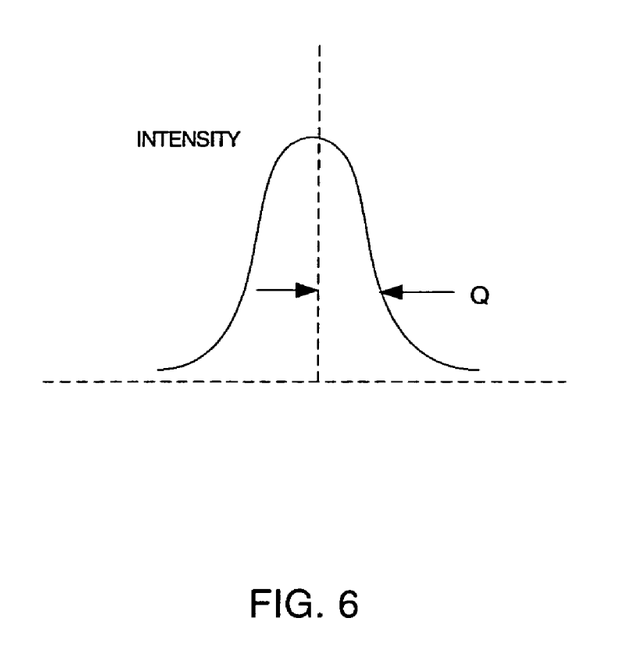
FIG. 6 is an illustration of a regional layout for calculating variance according to an illustrative embodiment of the invention.

In any case, the expected symbol type for a given application is determined by the selection by the operator, and an additional symbology-specific filtering 207 is applied to those symbols which may benefit. This filtering is a variance-based filter for quickly determining which coarse located rectangle is most likely to contain a symbol. A central region of the rectangle is determined and assumed to have the best data intensity variation. As shown in FIG. 6, number of smaller regions (windows) around the center are determined, such as approximately one fourth of the total rectangle size. The variance within each of the smaller windows is calculated and the variance of the sum of the variances is calculated according to the formula:

$$Q = \frac{\sum_{i=1}^{4} \text{Var}(i)}{\text{Var}\sum \text{var}(i)}$$

This results in a single Q value for each of the candidate rectangular regions. Any candidates having a Q value less than a predetermined threshold are deemed to be unlikely candidates and are discarded. If this results in one or more viable candidates, then processing continues to the next step. Otherwise, the system has failed to identify any candidate symbol regions, and further processing for recognition and data extraction will be fruitless. Rather than continue processing the symbol, in this case, the process skips immediately to the second pass with the non-morphed image 215.

Figure 3:
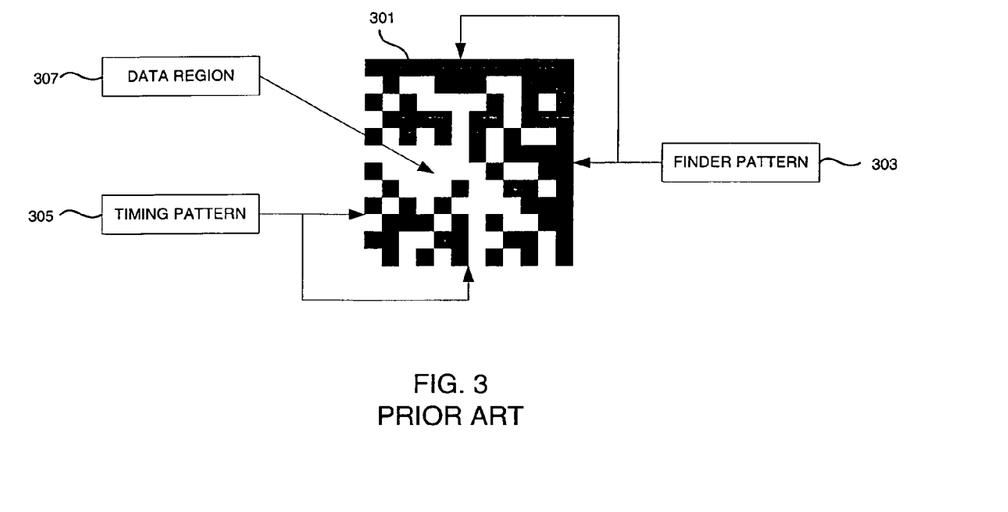
FIG. 3 illustrates an example of a two-dimension matrix for encoding data, according to a prior art industry standard.

Assuming that at least one candidate is identified, additional generic refinement may be possible, so that further processing is properly focused. In particular, a symbol imprinted according to a standardized two-dimensional symbol matrix 301, as illustrated in FIG. 3, contains numerous elements that can be quickly identified. As an example, a data matrix symbol finder pattern will have a characteristic finder pattern. Two adjacent sides of the rectangular matrix are viewed as solid lines oriented at a right angle, and collectively known as the "finder pattern" 303. The two remaining sides of the rectangle are also at right angles to each other, and contain alternating dark and light elements to create a "timing pattern" 305. The timing pattern provides a visual matrix of rows and columns defined as the "data region" 307 into which binary information is encoded. For example, symbol matrix 301 has two orthogonal timing edges that are each ten elements long, not counting the edges themselves. This standard defines a ten-by-ten data region, the visual decoding of which is the ultimate goal of the invention, as further discussed below. For the present step, it is sufficient to recognize that each of the four edges is distinguishable from other information in the image, in that they have specific starting and ending points.

For other types of matrices, such as the SEMI T-7 matrix standard, the so-called primary border row and primary border column each contain dots in each cell (corresponding to the finder pattern), and the opposing borders contain dots in alternating cells (corresponding to the timing pattern). This is an example of a variation in the markings, as mentioned above, where the cell markings are not contiguous. There may be additional alignment patterns, such as a solid alignment bar through the center of a matrix, the recognition of which can also benefit the coarse image processing stages, depending upon the application. The invention should work equally well with recognition of other shapes of data symbols and alignment or timing indicia.

Figure 4:
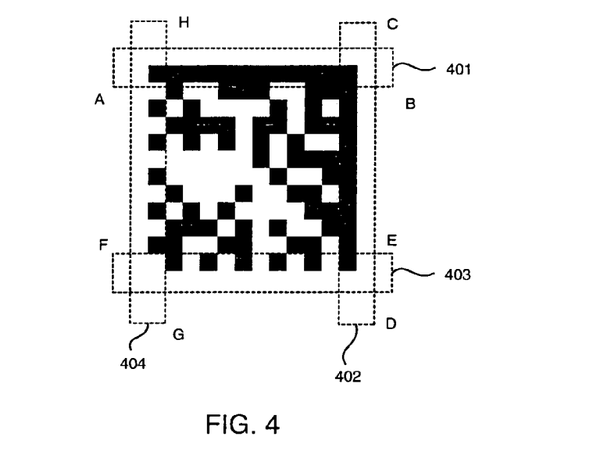
FIG. 4 is a diagram showing the relationship between edge-specific data sets obtained from processing a two-dimension matrix according to an illustrative embodiment of the invention.

Each candidate image can be evaluated to determine the exact location of an area having encoded information similar to that found along the edges of the model matrix. For example, the standardized matrix, such as the example illustrated in FIG. 3, can be evaluated for the precise edges of a rectangular region to be decoded, made up from the constituent four edges, as shown in FIG. 4. A first region 401 having endpoints A and B defines one side of the candidate rectangular image region. A second region 402 has endpoints C and D, a third 403 has endpoints E and F, and a fourth 404 has G and H.

Figure 5:
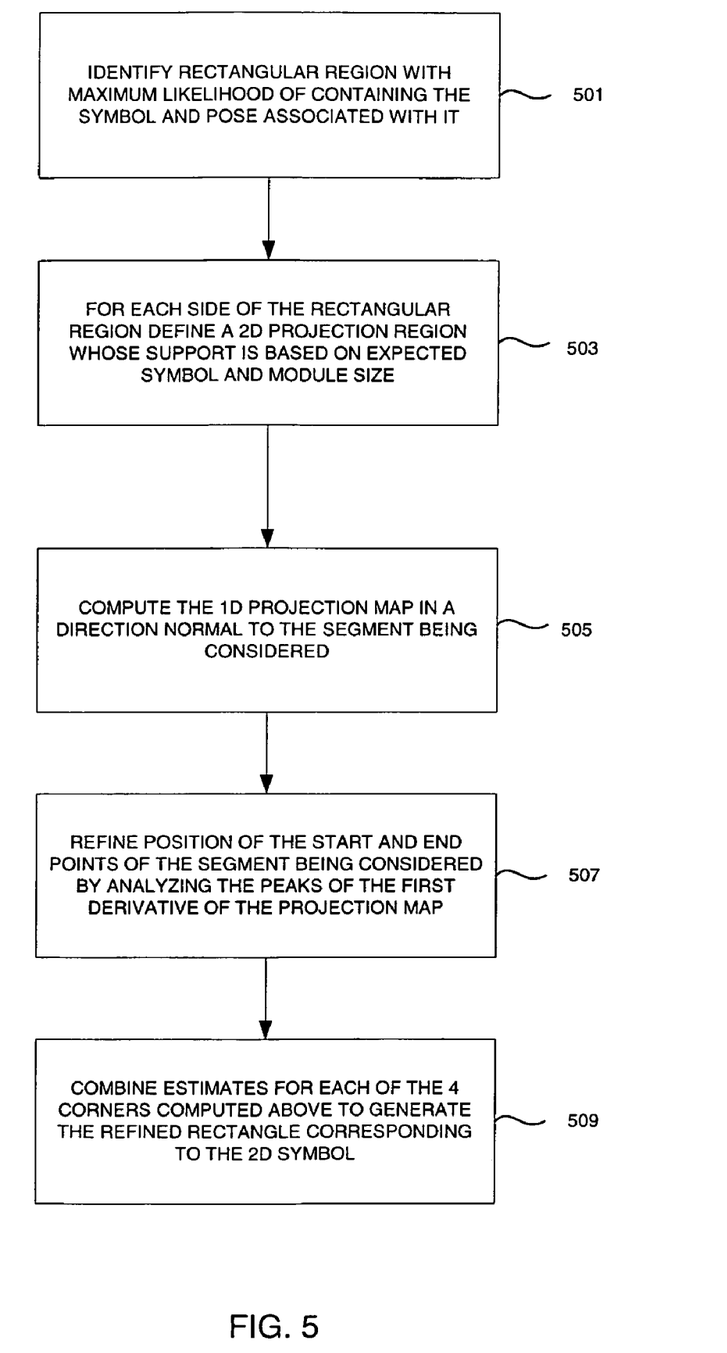
FIG. 5 is a flowchart of a symbology-specific refinement step, according to an illustrative embodiment of the invention

As shown in FIG. 5, given a rectangular region likely to contain a symbol 501, each of the 4 edge regions (each corresponding to a side of the coarse rectangle) is analyzed independently to refine the position of the start and end points of each segment. A relatively long and narrow 2D region is specified 503 for each edge, having a location, angle and size based upon the expected dimensions of the symbol module. A mono-dimensional intensity projection map of the intensity information contained within this 2D region is computed 505 in the direction normal to the segment being considered. The position of the starting point and ending point of the segment being considered are refined 507 by analyzing the peaks of the first derivative of the projection map. That is, the edges of the symbol image are recognized as being discontinuous from the background, causing a visual discontinuity. These are the initial refined estimates of the edges.

After all four edge segments are analyzed, there are two possible refined estimates for locations of each corner of the 2D rectangular region already estimated—one derived from each of the two intersecting edge segments (e.g., ends A and H). The final refined position is computed by interpolating 509 a position between the initial refined estimates. The four edge segments from the data representing the image can then be labeled in sequence, such as AB, CD, EF, GH, for further processing to determine the symbol orientation.

Once this generic refinement has been completed, and the edges of the rectangle (or other shape) have been located with some precision, an additional step of refinement can be imposed, depending again upon the type of symbol being detected. For the 2D matrix a symbology-specific refinement 211 is accomplished in the illustrative embodiment as follows. Each of the four projection regions is known to be either a finder pattern or a timing pattern, with two edges of each being adjacent to each other on opposite corners of a 2D matrix (or at opposite ends in a bar-type code). Each edge therefore has an expected number of intensity peaks: one for the finder pattern edges and many for the timing pattern edges. The number of actual intensity peaks, subtracted from the expected number of peaks, gives a measure of how close each edge comes to matching an edge type. By taking the absolute value of this measure, and evaluating the entire sequence of segments, each edge can be quickly identified.

For example, a timing edge of ten elements expects six peaks, and the number of peaks on edges AB and CD can be counted as approximately one, and EF and GH can be counted as approximately six. Taking the computations in clockwise order (for example), assuming AB is a first finder pattern edge, one gets 0, 0, 0, 0. Were one to take GH as a finder pattern, the results would have been 5, 0, 5, 0. Taking EF as a first finder pattern, one gets 5,5,5,5, and taking CD as a first finder pattern: 0, 5, 0, 5. From these possible combinations, one can quickly determine the orientation of the finder pattern and the timing pattern. All that is left is to decode the symbol.

Given a timing pattern and a finder pattern, the 2D matrix is decoded by further examination of the dots (i.e., light intensities) at the intersection of rows and columns (cells) defined by the timing patterns. In the example, the alternating light and dark data along one edge defines the rows and the alternating light and dark regions along the adjacent edge define the columns. The light intensity peaks and valleys along each of the timing edges thus define locations of the data elements within the data region. Each data cell can be classified as either dark or light, with respect to the background, according to the binary information to be encoded in the symbol.

The binary pattern thus decoded can then be evaluated according to validity criteria established by the application such as error detection and correction codes (ECC), cyclic redundancy check (CRC), or code confinement to a limited set of valid combinations (e.g., numbers within a prescribed range). Results that are invalid, notwithstanding the available correction codes, can be handled according to the particular application. Typical actions may include triggering the system interface to sound an alarm, actuate a mechanical device, record data or print an audit record, halt a process, or similar specific warning or remedial actions.

Since events such as alarms and process stoppages can result in time-consuming and expensive digressions, the process and apparatus according to the present invention carries out an additional step prior to terminating. As described earlier, the first pass included coarse location, refinement and decoding based upon an image that has undergone morphology. However, the non-morphed image has been temporarily retained in memory for the case in which the morphed image does not result in valid decoding. Upon failure to detect a valid code, or a failure to identify any candidate symbol regions, the system according to the present invention performs a second pass using the data from the non-morphed image. Location, refinement, and decoding processing during the second pass proceeds in the same manner as the first pass, as described herein above and illustrated in FIG. 2. However, at the end of the second pass, if the decoding continues to fail to find a valid code, then the failure mode for the present object is set and the process terminates.

It should be noted that the "failure mode" of the present process could be used to acquire a new image, perhaps after an automatic adjustment (such as mechanical or lighting arrangements), and the entire two-pass processing could be again executed. This can be repeated a configurable number of times, depending upon the application and the available granularity of adjustments, until the system has exhausted a reasonable number of tries. However, nothing prevents the system from incorporating additional cameras and processing prior to ultimately rejecting the object.

Although the process has been described for processing of a single image that may contain one or more symbols, one of ordinary skill in the art will appreciate that multiple images of the object can be simultaneously captured and processed. In a typical operation, an object carrying the symbol may have several typical orientations as it emerges from a prior process, such as face down, or sideways. For example, where symbols can occur on either side of an object, a camera can be arranged to acquire images of the preferred region found on both sides, either simultaneously or serially, or multiple cameras can be arranged for the same purpose. This will permit simultaneous processing of multiple images and successful decoding of any of them may result in passing the object rather than rejecting it.

Similarly, external factors may require the use of optics that reverse, rotate, invert or otherwise permute an image and any symbols it may contain. Some objects may even have inverted contrast, such as may be caused by use of specialized lighting or image acquisition devices, or because of the particular imprint necessary on a mask. Symbol module rotations, within perhaps predefined tolerances, are automatically handled by the process already described. Other topologic and contrast permutations can also be evaluated as part of the code validity checking according to the present invention, because there is a finite number of permutations. For example, an 8 by 32 matrix may be viewed upside down, or in reverse, or with inverted contrast, making eight possible combinations that can each be quickly evaluated for validity.

Furthermore, the functional steps described herein may be modified with other suitable algorithms or processes that accomplish functions similar to those of the method and apparatus described. For example, different morphology functions can be used, depending upon the shapes of the dots, such that the morphed images are more likely to contain dots conforming to the preferred shape, and filters such that different types of noise observed in a particular application can be successfully attenuated. Different preprocessing and filter selections may also be made based upon the characteristics of the symbol, i.e., based upon their appearance.

Although the invention is shown and described with respect to several illustrative embodiments thereof, it should be appreciated that the foregoing and various other changes, omissions, and additions in the form and detail thereof could be implemented without changing the underlying invention.

What is claimed is:

1. A method of decoding a two-dimensional symbol matrix comprising the steps of:
   acquiring an image of an object;
   pre-processing said image to obtain a first filtered image and a second filtered image, wherein said first and second filtered images are obtained using different filters; and
   evaluating each of said first and second filtered images for a valid symbol, the evaluating step comprising the steps of:
      defining one of said first and second filtered image as a current image;
      locating at least one coarse location within said current image that appear to contain a symbol shape to determine a set of symbol candidate locations, the locating step comprising the steps of:
         measuring a first and second derivative of image intensity values across said image; and
         identifying areas of said image in which said first and second derivatives correspond to areas approximating predetermined shape and size parameters of said two-dimensional symbol;
         whereby information for each such identified area comprises a location and an orientation;
      refining at least one of said symbol candidate locations to obtain a refined symbol image;
      evaluating said refined symbol image by decoding to determine if it corresponds to a valid symbol; and
      if said symbol image fails to correspond to a valid symbol, then repeating said steps of locating, refining and evaluating after having redefined said current image to contain said second filtered image.

2. The method of claim 1 in which said step of identifying areas further comprises the steps of:
      filtering the results of said measuring step to remove from further consideration any areas of said image that fail to meet predetermined threshold criteria selected from the set of size, shape, orientation, and location.

3. A method of decoding a two-dimensional symbol matrix comprising the steps of:
   acquiring an image of an object;
   pre-processing said image to obtain a first filtered image and a second filtered image, wherein said first and second filtered images are obtained using different filters; and
   evaluating each of said first and second filtered images for a valid symbol, the evaluating step comprising the steps of:
      defining one of said first and second filtered image as a current image;
      locating at least one coarse location within said current image that appear to contain a symbol shape to determine a set of symbol candidate locations, the locating step comprising the steps of:
      refining at least one of said symbol candidate locations to obtain a refined symbol image, the refining step comprising the steps of:
         performing a variance-based analysis of each of said at least one symbol candidate locations, the variance-based analysis comprising the steps of:
            dividing each symbol candidate location into a plurality of zones;
            calculating an intensity variance for each of said zones; and
            calculating a variance of a sum of the variances for each of said plurality of zones;
            whereby a single variance value is determined for each candidate location; and
         reducing said set of symbol candidate locations according to whether a variance calculation for a candidate location exceeds a predetermined threshold;
      evaluating said refined symbol image by decoding to determine if it corresponds to a valid symbol; and
      if said symbol image fails to correspond to a valid symbol, then repeating said steps of locating, refining and evaluating after having redefined said current image to contain said second filtered image.

4. A method of decoding a two-dimensional symbol matrix comprising the steps of:
   acquiring an image of an object;
   pre-processing said image to obtain a first filtered image and a second filtered image, wherein said first and second filtered images are obtained using different filters; and
   evaluating each of said first and second filtered images for a valid symbol, the evaluating step comprising the steps of:
      defining one of said first and second filtered image as a current image;
      locating at least one coarse location within said current image that appear to contain a symbol shape to determine a set of symbol candidate locations, the locating step comprising the steps of:
      refining at least one of said symbol candidate locations to obtain a refined symbol image:
      evaluating said refined symbol image by decoding to determine if it corresponds to a valid symbol, the step of evaluating said refined symbol image comprising the steps of:

performing a generic refinement on said refined symbol to obtain a refined location of a plurality of locator patterns of said symbol candidate, the step of performing a generic refinement comprising the steps of:
  determining a set of two-dimensional areas within said refined symbol candidate, each said two-dimensional area being located and oriented to contain 2D image information corresponding to a locator pattern of a symbol;
  evaluating said 2D image information to determine a preliminary refined location where said corresponding locator pattern begins and ends; and
  interpolating said preliminary refined locations obtained from two-dimensional areas corresponding to adjacent locator patterns of said symbol to determine a secondary refined location where each said locator pattern of said symbol begins and ends;
then performing a symbology-specific refinement; and
then decoding the result of said symbology-specific refinement; and
if said symbol image fails to correspond to a valid symbol then repeating said steps of locating, refining and evaluating after having redefined said current image to contain said second filtered image.

5. A method of decoding a two-dimensional symbol matrix comprising the steps of:
  acquiring an image of an object;
  pre-processing said image to obtain a first filtered image and a second filtered image, wherein said first and second filtered images are obtained using different filters; and
  evaluating each of said first and second filtered images for a valid symbol by decoding, wherein said second filtered image is not evaluated unless said first filtered image fails to result in a successful evaluation, the evaluating step comprising the steps of
    defining one of said first and second filtered image as a current image;
    locating at least one coarse location within said current image that appear to contain a symbol shape to determine a set of symbol candidate locations;
    refining at least one of said symbol candidate locations to obtain a refined symbol image;
    evaluating said refined symbol image by decoding to determine if it corresponds to a valid symbol, the step of evaluating said refined symbol image comprising the steps of:
      performing a generic refinement on said refined symbol to obtain a refined location of a plurality of locator patterns of said symbol candidate;
      then performing a symbology-specific refinement comprising the steps of:
        selecting a model symbol from a predetermined set of model symbols;
        evaluating said plurality of locator patterns according to said model symbol, to determine which of said locator patterns corresponds to a symbol-specific finder pattern inherent in said model symbol; and
        refining said symbol candidate by orienting said symbol candidate according to a predefined location of said finder pattern in said selected model symbol; and
      then decoding the result of said symbology-specific refinement; and
    if said symbol image fails to correspond to a valid symbol, then repeating said steps of locating, refining and evaluating after having redefined said current image to contain said second filtered image.

6. The method of claim 5 in which said step of evaluating further comprises the steps of:
  counting the number of light intensity peaks occurring along an axis of each of said locator patterns;
  comparing the number of said peaks in each respective locator pattern with a number of peaks expected according to said model pattern; and
  determining which of said locator patterns corresponds to each locator pattern according to said model pattern.

7. A method of decoding a two-dimensional symbol matrix marked on an object comprising the steps of:
  acquiring an image of an object;
  pre-processing said image to obtain a morphed image and a non-morphed image;
  locating a set of at least one coarse location of a symbol image candidate in said morphed image;
  filtering said set to discard any coarse location that fails to meet predetermined selection criteria selected from the set of location, orientation and size;
  decoding image information within any remaining coarse location according to a symbology-specific decoding method comprising the steps of:
    dividing each said coarse location into a plurality of zones;
    calculating an intensity variance for each of said zones;
    calculating a variance of a sum of the variances for each of said plurality of zones; whereby a single variance value is determined for each coarse location; and
    discarding any coarse location having a single variance value less than a predetermined threshold;
    defining a refined location of a symbol candidate by processing each remaining coarse location to determine a set of locator patterns within said coarse location;
    orienting each refined location according to said set of locator patterns with respect to a selected symbol model defining locator patterns; and
    interpreting information in a data region of said symbol candidate according to said orientation, and said locator patterns with respect to said selected symbol model;
  evaluating whether said decoding produced a valid result; and
  if not, then repeating said steps of filtering, decoding and evaluating using said non-morphed image;
  whereby said symbol matrix is either decoded or said object is rejected as not having an observable and decodable symbol.

8. An apparatus for decoding a two-dimensional symbol matrix comprising:
  an image acquisition device for obtaining an image of an object; and
  a processor for pre-processing said image to obtain a first filtered image and a second filtered image, wherein said first and second filtered images are obtained using different filters; and
  evaluating each of said first and second filtered images for a valid symbol by decoding, wherein said second filtered image is not evaluated unless said first filtered image fails to result in a successful evaluation, the processor comprising:

a morphology filter for creating said first filtered image;

a coarse location processor for determining a set of coarse locations of symbol candidate information in said image;

a generic filter for removing from said set any coarse locations that fail to meet predetermined criteria selected from the set of size, location, and orientation;

a variance filter for removing from said set any coarse locations having an intensity variance less than a predetermined threshold;

a refinement processor for determining the specific location of image information corresponding to predetermined locator patterns according to a model image selected from a set of model images;

an orientation processor for identification of a symbol orientation according to said information corresponding to predetermined locator patterns;

a symbol decoder for decoding data region information in said image; and a symbol evaluator to determine if said decoded symbol is a valid symbol.

* * * * *